March 25, 1952  M. UNGER ET AL  2,590,803
TANK JOINT
Filed July 9, 1949
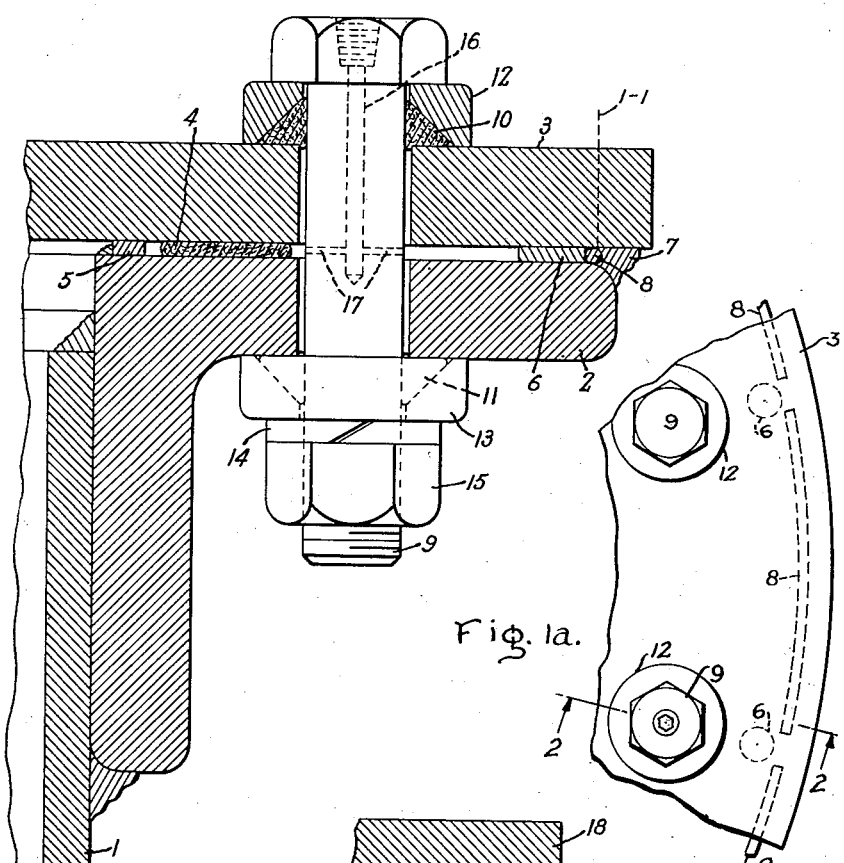
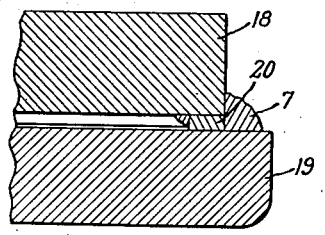
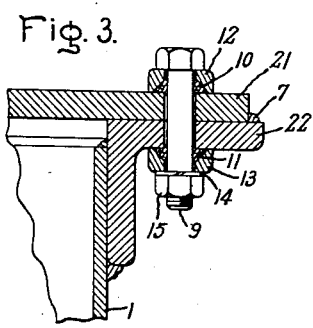
Inventors:
Magnus Unger,
Myron H. Bates,
by Ernest H. Britton
Their Attorney.

Patented Mar. 25, 1952

2,590,803

UNITED STATES PATENT OFFICE 2,590,803

TANK JOINT

Magnus Unger and Myron H. Bates, Pittsfield, Mass., assignors to General Electric Company, a corporation of New York Application July 9, 1949, Serial No. 103,874

3 Claims. (Cl. 220—31)

This invention relates to containers for electrical apparatus, and more particularly to a construction for sealing joints in such containers.

In the construction of tanks for certain types of electrical apparatus, such as transformers, the usual practice is to seal the joint between the tank cover and the circumferential flange at the top of the tank, or the joint between sections of a multi-section tank, by means of a resilient gasket. The adjoining metallic surfaces and interposed resilient gasket are then clamped together by means of circumferential bolts.

However, when a leak develops in such a gasketed joint, considerable difficulty and expense is sometimes involved in repairing such leaks. The procedure which is customarily followed in such cases is to replace the defective and leaking gasket by means of a new gasket. When the leak is at the cover joint of a transformer tank, for example, this requires raising or removing the cover of the tank in order to give access for removal of the defective gasket, and also generally requires that all electrical connections to the bushings on the transformer be disconnected while the replacement is being made. If the leaking gasket is at the joint between the sections of a multi-section tank, considerable difficulty is also similarly involved in making the necessary replacement. Furthermore, there is always a degree of uncertainty as to whether the replacement gasket itself will be leak-proof.

In the replacement process which is customarily used, there is also always the danger that the insulating oil inside of the transformer tank will absorb moisture while the tank cover is raised or removed, as well as the danger that tools or foreign particles may possibly be dropped or fall into the oil and windings inside of the transformer tank.

It is an object of our invention to provide a construction which will reduce the expense, and eliminate much of the difficulty which has hitherto been encountered in providing leakproof joints for containers of electrical apparatus, such as transformer tanks.

It is a further object of our invention to provide a new and improved means for sealing the joints of containers of electrical apparatus, such as transformer tanks, which may be utilized either at the time of the original manufacture of the transformer tank at the factory, or in making repairs to the transformer tank at the place of its operation.

In accomplishment of these objectives, our invention provides a joint for a container of electrical apparatus, such as a transformer tank, which is sealed by the cooperative action of a circumferential sealing weld on the outer periphery of the joint as well as sealing gaskets on each end of the circumferential bolts. The principle upon which our invention is based, therefore, is to retain undisturbed the original gasket and to add a "second line of defense" in the form of a peripheral sealing weld, and seals for the circumferential bolts.

In accordance with our invention, it is also practical in the building of new transformer tanks to omit the conventional gasket, retaining ring and stop buttons and to depend on the circumferential sealing weld and gasketed bolts to be described hereinafter.

The features of our invention which we believe to be novel are set forth with particularity in the appended claims. Our invention itself, however, both as to its organization and use, together with further objects and advantages thereof, may best be understood by reference to the following description taken in connection with the accompanying drawing in which Fig. 1 represents a cross-sectional view along line 2—2 of Fig. 1a of a tank cover and flange sealed in accordance with our invention as adapted to repair of an existing installation; Fig. 1a is a partially cut-away plan view of the cover member shown in Fig. 1; while Figs. 2 and 3 represent modified joints in accordance with our invention but more particularly adapted to factory-manufactured construction.

In Fig. 1, there is shown the side of a transformer tank 1 having a flange 2 rigidly attached to the side of the tank by some suitable means, such as, for example, welding. A tank cover 3 is positioned over the flange 2, with a resilient gasket 4, a retaining ring 5, and stop button 6 interposed between the adjoining surfaces of the flange and the cover. The stop button 6 which is illustrated is one of a plurality of such stop buttons which are attached along the outer periphery between the flange 2 and cover 3.

The resilient gasket 4 is prevented from sliding out of place partly by the bolts 9 which clamp the flange 2 and cover 3 tightly together, and partly by the retaining ring 5 which is welded in position around the inner periphery of flange 2. The purpose of the stop buttons 6 is to prevent or reduce motion of the cover 3 over the gasket 4 due to flexing caused by variation in the internal pressure of the tank. If this motion is not prevented the gasket is likely to be damaged and cause leakage. If such leakage occurs, the method of repairing the leak in accordance with our invention is shown in Fig. 1.

In accordance with our invention, when a leak develops in gasket 4 a light weld 7 is applied at the outer periphery of the joint between the flange 2 and cover 3. As shown most clearly in Fig. 1a, steel insert pieces 8, which may be of low carbon steel, span the circumferential arc between adjacent stop buttons 6, being positioned closely adjacent the radially outer edge of the flange 2. These insert pieces act as a base for the weld 7.

To supplement the sealing action of the weld 7, the circumferential bolts 9 are provided with special resilient ring gaskets 10 and 11. Ring gasket 10 is positioned on each bolt 9 above the upper surface of the cover 3, while ring gasket 11 is positioned on each bolt below the lower surface of flange 2. These ring gaskets 10 and 11 are seals against leakage through the clearance space between the bolt 9 and the axial passage in the flange and cover through which the bolt passes. Special countersunk washers 12 and 13 are provided to compress the originally square section ring gaskets into triangular sections which give very dependable seals. A lock washer 14 is positioned on the bolt 9 adjoining countersunk washer 13 and a nut 15 is positioned on the bolt 9 below the lock washer 14.

The particular bolt which is illustrated in Fig. 1 is provided with a test hole comprising an axial passage 16 through the center of the bolt 9, and radial passages 17 communicating with the exterior surface of the bolt and also with the axial passage 16. The purpose of the test hole is to provide a means by which air or gas of a predetermined pressure can be applied to the interior surface of the joint between the cover and flange, to permit testing for leakage in the circumferential weld 7, as well as in the ring gaskets 10 and 11. This test can be made by applying external air or gas pressure to axial passage 16, and coating the joint surface with a soap and water solution.

When the upper member 3 projects out farther radially than does the lower member 2 as shown in Fig. 1, the weld 7 must of necessity be an overhead weld. It may be desirable to cut the upper member 3 circumferentially along line 1—1 by some suitable means such as an oxy-acetylene torch, in order to facilitate the welding process. When such a cut is made, member 3 will no longer project further outward radially than member 2, and an overhead weld would not be necessary.

Thus, when it is necessary to make a field repair of a leaking gasketed joint, the repair may be made in accordance with our construction without the necessity of any disassembly operations, merely by applying a light circumferential weld around the outer periphery of the tank joint and providing new gasketed bolts as previously described. It should be noted that the sealing weld 7 is made before changing the bolts, thus insuring that there is no change in the compression of the original gasket 4.

There is shown in Fig. 2, a modified construction which may be used in the original factory fabrication of the transformer tank. As will be seen in the drawing, there are shown in Fig. 2 two members 18 and 19, having adjacent surfaces which must be sealed. These members 18 and 19 may be the top cover and flange of a transformer tank, similar to the disclosure of Fig. 1, or they may be the two adjoining flanges of adjacent sections of a multi-section tank. The principal difference between the construction shown in Fig. 2 and that of Fig. 1 is that in Fig. 2 a retaining ring 20 is tack-welded at the outer periphery of the lower surface of member 18, in place of the buttons 6 and insert pieces 8 shown in Fig. 1. Ring 20 is welded in position at the time of the assembly of the transformer tank at the factory, whereas the insert pieces 8 of Fig. 1 are positioned at the time of the repair of the tank joint, without separating the cover 3 and flange 2. Also, it will be noticed that the upper member 18 is constructed to have a smaller diameter than the lower member 19. This facilitates the application of the weld 7, and avoids the necessity of an overhead weld, such as is required in the structure of Fig. 1, where our method is applied to the repair of an operating installation.

There is shown in Fig. 3 a further modification of our invention, particularly adapted for construction at the factory, in which two adjoining surfaces are sealed solely by the cooperative action of a peripheral sealing weld and resilient gaskets on the circumferential bolts. No resilient circumferential gasket is interposed between the adjoining surfaces, as in the constructions of Figs. 1 and 2. Also, the elimination of the circumferential gasket permits the elimination of retaining rings, stop buttons, and insert pieces. Otherwise, the construction is similar to that shown in Fig. 1. Referring now to Fig. 3, there is shown an upper member 21 and a lower member 22 having adjoining surfaces. A peripheral sealing weld 7 is provided at the outer surface of the joint. Bolt 9 is sealed by ring gaskets 10 and 11. Special countersunk washers 12 and 13 are provided to compress the originally square section ring gaskets into triangular sections which give very dependable seals. Lockwasher 14 is positioned on the bolt 9 adjoining countersunk washer 13, and a nut 15 is positioned on the bolt 9 below the lockwasher 14.

It will readily be seen that the construction which we have described, while adapted for use in the original manufacturing process, is particularly valuable for use in the field when repairs must be made to transformer joints which have developed leaks. The use of this construction will save much expense and trouble, as compared to constructions heretofore in use for repairing defective or leaky joints. The use of the welded joints in combination with gasketed bolts, in accordance with our invention, eliminates the need of any disassembly operation such as raising or removing the cover of the tank to give access for removal of the defective gasket.

When using our exterior weld construction on transformer tanks, there is no need to disconnect the transformer bushings from the winding. In fact, there is no work to be done inside of the tank. Also the construction of our invention eliminates the danger of contamination of the insulating oil inside of the transformer tank by absorbed moisture when the cover is removed, and eliminates the danger of having tools or foreign particles dropped into the oil and winding. Thus, it will be seen that our invention provides a construction which is speedier and more economical than constructions which have heretofore been used for sealing joints between the flange and cover of a container for electrical apparatus such as a transformer tank, or between the adjoining surfaces of the sections of a multi-section tank. Furthermore, the circumferential weld of our invention has as its only function the provision of a seal which is gas and oil-tight. Hence, the weld can be made very light and can be readily broken open should this become necessary.

While there has been shown and described particular embodiments of our invention, it will be obvious to those skilled in the art that various changes and modifications can be made therein without departing from the invention and, therefore, it is aimed in the appended claims to cover all such changes and modifications as fall within the true spirit and scope of the invention.

What we claim as new and desire to secure by Letters Patent of the United States is:

1. In a tank structure of the type having two metal members circumferentially jointed to one another and a resilient gasket between the jointed surfaces of said members, at least one of said metal members being a flange attached to said tank, said tank normally being at least partially filled with a medium which changes its pressure in response to temperature changes, a ring-shaped member between said jointed metal members radially inwardly of said resilient gasket, spaced-apart button-like metal members circumferentially arranged between said jointed members radially outwardly of said gasket and adjacent the radially outer edge of said flange, said button-like members serving to protect said resilient gasket from damage due to flexing of said jointed metal members, a plurality of metal insert members spaced around the periphery of said joint closely adjacent the radially outer edge of said flange so as to span the space between adjacent button-like members, a light peripheral weld around the exterior edge of said joint, said insert members serving as a base for said peripheral weld, a plurality of bolts circumferentially arranged radially inwardly of said weld and passing through said jointed metal members, a resilient gasket positioned on each of said bolts where it emerges from the outer surface of each of said jointed metal members, a countersunk washer on each of said bolts immediately adjacent each of the resilient gaskets on said bolts, each of said gaskets fitting into the countersunk portion of its respective washer, a nut member positioned on the end of each of said bolts to normally maintain said resilient gaskets and washers on said bolts in compression, at least one of said bolts being provided with a passage communicating with the space between said circumferential gasket and said weld to permit testing said joint for leakage.

2. In a tank structure of the type having two metal members circumferentially jointed to one another and a resilient gasket between the jointed surfaces of said members, at least one of said metal members being a flange attached to said tank, said tank normally being at least partially filled with a medium which changes its pressure in response to temperature changes, a ring-shaped member between said jointed metal members radially inwardly of said resilient gasket, spaced-apart button-like metal members circumferentially arranged between said jointed members radially outwardly of said gasket and adjacent the radially outer edge of said flange, said button-like members serving to protect said resilient gasket from damage due to flexing of said jointed metal members, a plurality of metal insert members spaced around the periphery of said joint closely adjacent the radially outer edge of said flange so as to span the space between adjacent button-like members, a light peripheral weld around the exterior edge of said joint, said insert members serving as a base for said peripheral weld, a plurality of bolts circumferentially arranged radially inwardly of said weld and passing through said jointed metal members, a resilient gasket positioned on each of said bolts where it emerges from the outer surface of each of said jointed members, a countersunk washer on each of said bolts immediately adjacent each of the resilient gaskets on said bolts, each of said gaskets fitting into the countersunk portion of its respective washer, and a nut member positioned on the end of each of said bolts to normally maintain said resilient gaskets and washers on said bolts in compression.

3. In a tank structure of the type having two metal members circumferentially jointed to one another and a resilient gasket between the jointed surfaces of said members, at least one of said metal members being a flange attached to said tank, said tank normally being at least partially filled with a medium which changes its pressure in response to temperature changes, a ring-shaped member between said jointed metal members radially inwardly of said resilient gasket, spaced-apart button-like metal members circumferentially arranged between said jointed members radially outwardly of said gasket and adjacent the radially outer edge of said flange, said button-like members serving to protect said resilient gasket from damage due to flexing of said jointed metal members, metal insert means positioned around the periphery of said joint closely adjacent the radially outer edge of said flange, a light peripheral weld around the exterior edge of said joint, said insert means serving as a base for said peripheral weld, a plurality of bolts circumferentially arranged radially inwardly of said weld and passing through said jointed metal members, a resilient gasket positioned on each of said bolts where it emerges from the outer surface of each of said jointed metal members, a countersunk washer on each of said bolts immediately adjacent each of the resilient gaskets on said bolts, each of said gaskets fitting into the countersunk portion of its respective washer, and a nut member positioned on the end of each of said bolts to normally maintain said resilient gaskets and washers on said bolts in compression.

MAGNUS UNGER.
MYRON H. BATES.

REFERENCES CITED

The following references are of record in the file of this patent:

UNITED STATES PATENTS

| Number | Name | Date |
|---|---|---|
| 620,872 | Park | Mar. 7, 1899 |
| 683,485 | Osbourn | Oct. 1, 1901 |
| 1,326,049 | Green | Dec. 23, 1919 |
| 1,493,269 | Kruesi | May 6, 1924 |
| 1,731,469 | Mansfield | Oct. 15, 1929 |
| 1,774,286 | Moss | Aug. 26, 1930 |
| 2,123,035 | Ashley | July 5, 1938 |
| 2,126,997 | Kramer | Aug. 16, 1938 |
| 2,286,668 | Brooke | June 16, 1942 |
| 2,335,174 | Crawford | Nov. 23, 1943 |
| 2,401,606 | Brown | June 4, 1946 |

FOREIGN PATENTS

| Number | Country | Date |
|---|---|---|
| 12,655 | Denmark | Oct. 19, 1909 |
| 226,897 | Great Britain | Jan. 8, 1925 |
| 304,305 | Great Britain | June 27, 1929 |
| 313,249 | Italy | Dec. 20, 1933 |
| 646,958 | France | July 23, 1928 |